(12) United States Patent
Mehta

(10) Patent No.: US 7,777,388 B2
(45) Date of Patent: Aug. 17, 2010

(54) DISTRIBUTED COIL STATOR FOR EXTERNAL ROTOR THREE PHASE ELECTRIC MOTORS

(75) Inventor: Vinay Mehta, Germantown, TN (US)

(73) Assignee: Hunter Fan Company, Memphis, TN (US)

( * ) Notice: Subject to any disclaimer, the term of this patent is extended or adjusted under 35 U.S.C. 154(b) by 474 days.

(21) Appl. No.: 11/829,999

(22) Filed: Jul. 30, 2007

(65) Prior Publication Data

US 2008/0030096 A1 Feb. 7, 2008

Related U.S. Application Data

(60) Provisional application No. 60/834,664, filed on Aug. 1, 2006.

(51) Int. Cl.
*H02K 1/00* (2006.01)
(52) U.S. Cl. ............... 310/216.071; 310/216.069; 310/208
(58) Field of Classification Search ......... 310/216.069, 310/216.071–216.074, 216.095, 216.102, 310/216.104, 216.109, 258, 259
See application file for complete search history.

(56) References Cited

U.S. PATENT DOCUMENTS

| | | | | |
|---|---|---|---|---|
| 2,485,628 | A | * | 10/1949 | Morrill .................. 310/180 |
| 5,191,250 | A | * | 3/1993 | Kobayashi ........... 310/216.071 |
| 5,278,482 | A | | 1/1994 | Bahn |
| 5,289,064 | A | | 2/1994 | Sakamoto |
| 5,300,870 | A | | 4/1994 | Smith |
| 5,418,416 | A | | 5/1995 | Muller |
| 5,682,072 | A | | 10/1997 | Takahashi |
| 5,739,613 | A | | 4/1998 | Bahn |
| 5,834,873 | A | | 11/1998 | Muller |
| 5,909,072 | A | | 6/1999 | Muller |
| 6,028,377 | A | | 2/2000 | Sakamoto |
| 6,114,782 | A | | 9/2000 | Lin et al. |
| 6,114,790 | A | | 9/2000 | Fei |
| 6,121,712 | A | | 9/2000 | Sakamoto |
| 6,160,330 | A | | 12/2000 | Sakamoto |
| 6,236,133 | B1 | | 5/2001 | Nishikawa et al. |
| 6,242,883 | B1 | | 6/2001 | Strunk |
| 6,255,755 | B1 | | 7/2001 | Fei |
| 6,297,573 | B1 | | 10/2001 | Roth-Stielow et al. |
| 6,359,349 | B1 | | 3/2002 | Sakamoto |
| 6,359,406 | B1 | | 3/2002 | Chiu et al. |
| 6,545,376 | B2 | | 4/2003 | Ohnishi et al. |
| 6,703,749 | B2 | | 3/2004 | Kuroyanagi |
| 6,731,027 | B2 | | 5/2004 | Ohnishi et al. |
| 6,903,476 | B2 | | 6/2005 | Sakamoto |
| 6,911,801 | B2 | | 6/2005 | Youm |

(Continued)

*Primary Examiner*—Quyen Leung
*Assistant Examiner*—Leda Pham
(74) *Attorney, Agent, or Firm*—Baker Donelson

(57) ABSTRACT

A distributed coil stator (102) for external rotor electric motors includes a core having a cylindrical surface bounded by a first end surface and a second end surface, wherein a first set of openings (110) aligned in a first circular path (111) extends within the core from the first end surface to the second end surface, a second set of openings (114) aligned in a second circular path (115) positioned concentrically within the first circular path extends within the core from the first end surface to the second end surface, and a third set of openings (118) aligned in a third circular path (119) positioned concentrically within the second circular path extends within the core from the first end surface to the second end surface.

11 Claims, 2 Drawing Sheets

U.S. PATENT DOCUMENTS 6,954,042 B2  10/2005  Lee et al.
7,064,470 B2   6/2006  Yokoyama et al.
7,145,278 B2  12/2006  Sakamoto
7,245,051 B2   7/2007  Hosono et al.

* cited by examiner

DISTRIBUTED COIL STATOR FOR EXTERNAL ROTOR THREE PHASE ELECTRIC MOTORS

CROSS REFERENCE TO RELATED APPLICATION

This application claims the benefit of priority to U.S. provisional patent application Ser. No. 60/834,664, filed Aug. 1, 2006, which is incorporated by reference herein.

TECHNICAL FIELD

This invention relates to electric motors, and specifically to a distributed coil stator for external rotor electric motors.

BACKGROUND OF INVENTION

Electric motors have existed for many years. Today, some electric motors are designed with a rotor disposed radially outward of the stator. These motors are commonly referred to as "inside-out" or "external rotor" electric motors and are typically of the three-phase induction type. External rotor electric motors have many applications, typically commercial or industrial, such as for fans, pumps, machine drives, etc. Furthermore, with the advent of single-to-three phase electronic converters, three-phrase external rotor motors can also be used in residential applications and other environments limited to single-phase electric service.

Typically, the stator of an external rotor electric motor includes coils (or windings) for each phase that are inserted through slots of the same size and shape positioned along the periphery of the stator at a single radius. As a result, the coils are bundled together and cross-over or overlap each other resulting in lengthy coil wire usage, high heat generation requiring additional copper and metal materials for dissipation, and high magnetic losses causing low electro-mechanical efficiency. Additionally, the typical stator design limits the motor speed options, which is a function of the number of slots that can be positioned on the periphery of the rotor.

Accordingly, it is seen that a need exists for a stator for external rotor electric motors that avoids coil wire bundling and cross-over and offers more flexibility for the number of slots to overcome the foregoing consequences. It is to the provision of such therefore that the present invention is primarily directed.

SUMMARY OF INVENTION

The invention, in accordance with exemplary embodiments described herein, provides a distributed coil stator for external rotor electric motors. A general exemplary embodiment includes a core having a cylindrical surface bounded by a first end surface and a second end surface. The core includes a first set of openings aligned in a first circular path extending from the first end surface to the second end surface, a second set of openings aligned in a second circular path positioned concentrically within the first circular path extending from the first end surface to the second end surface, and a third set of openings aligned in a third circular path positioned concentrically within the second circular path extending from the first end surface to the second end surface.

A general exemplary method includes configuring the shape or size of at least one of the first, second, and third set of openings in the core dependent on the number of openings needed to obtain a desired number of magnetic poles corresponding to a desired motor speed.

DETAILED DESCRIPTION

Figure 1:
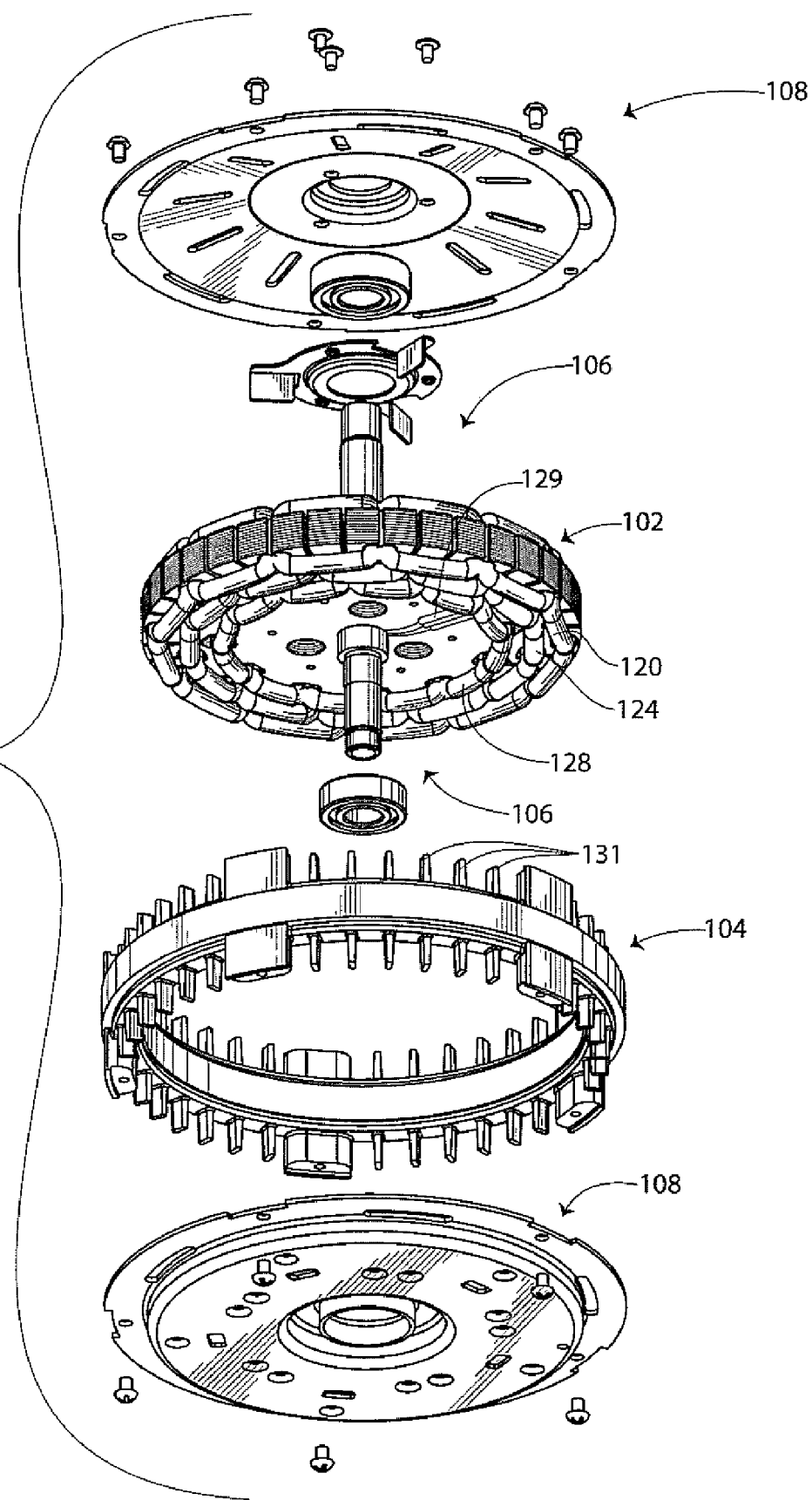
FIG. 1 is an exploded view that includes the distributed coil stator for external rotor motors shown in FIG. 1.
Figure 2:
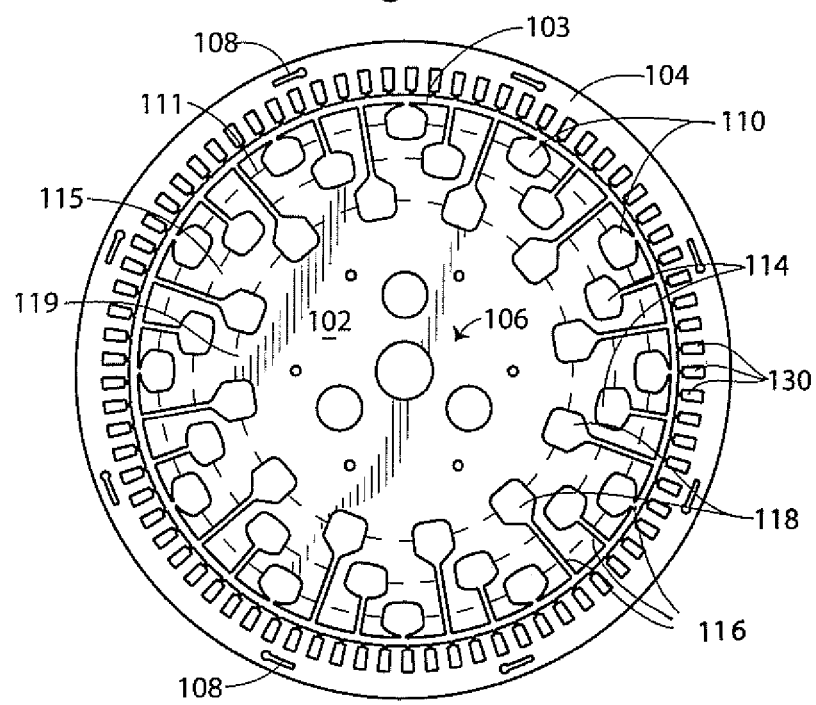
FIG. 2 is a top view of the distributed coil stator for external rotor motors shown in FIG. 1.
Figure 3:
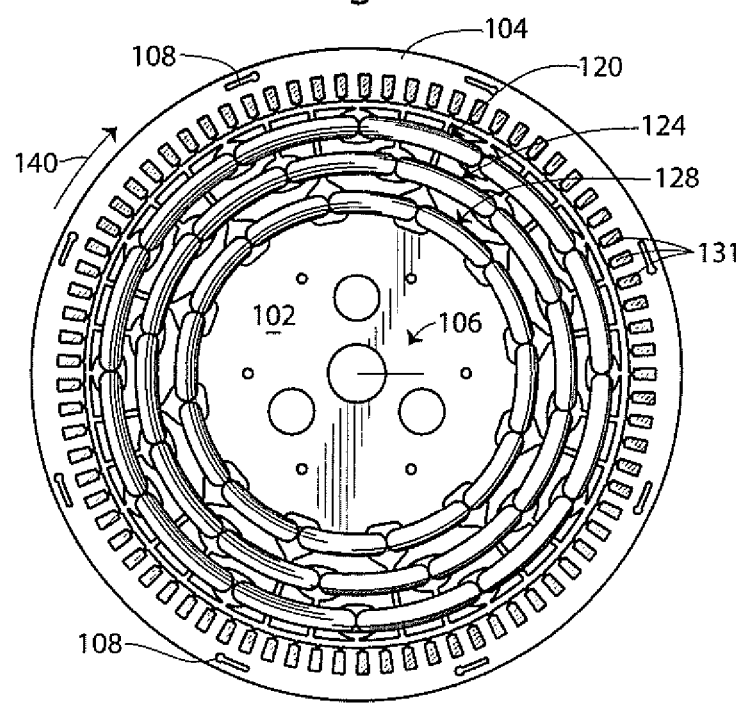
FIG. 3 is another top view of the distributed coil stator for external rotor motors shown in FIG. 1.

With reference to the drawings, there is shown a distributed coil stator 102 for external rotor motors in a preferred form of the invention. A rotor 104 is disposed radially outward of the stator 102 with a gap (or "air gap") 103 in between. In another sense, the stator 102 is disposed concentrically within the rotor 104. The stator 102 includes securing means 106, such as one or more shafts, bearings, bolts and corresponding openings, washers and plates, etc. for securing components of the stator 102 together and securing the stator 102 for operation. The rotor 104 includes similar securing means 108 for securing components of the rotor 104 together, securing the rotor 104 for operation, and securing other parts to the rotor 104 such as one or more fan blades, pump impellers, drive gears or belts, etc. Such components typically include a plurality of sheets of metallic material (such as iron) or "laminations" that are secured together to form the stator 102 and/or the rotor 104 respectively.

The stator 102 is generally cylindrical in shape with a top end surface and a bottom end surface. The stator 102 also includes various slots 110, 114, 118 positioned along concentric cross-sectional circular paths 111, 115, 119 and extending longitudinally along the stator 102. The slots 110, 114, 118 typically also include openings 116 (e.g., linear) extending radially inward from the cylindrical exterior surface to a wider opening along the circular path 111, 115, 119, which can facilitate inserting and supporting coil wiring. Each set or circular path 111, 115, 119 of slots 110, 114, 118 may have different characteristics such as different sizes (e.g., dimensions) and/or shapes. These characteristics are varied in order to vary the number of slots disposed in the stator 102 (which corresponds to the number of magnetic poles of the stator 102 and therefore to the revolving speed of the rotor 104 during operation) to provide various revolving speed options using a stator 102 of the same diameter. Furthermore, these characteristics are varied in order to produce an equivalent amount of magnetic flux among each set of slots 110, 114, 118 to insure desirable (e.g., proper, efficient, etc.) motor operation.

Coils (or windings) 120, 124, 128 of an insulated electrical conductor extend through the slots 110, 114, 118 respectively. Since the slots 110, 114, 118 are separated along the circular paths 111, 115, 119, the coils 120, 124, 128 extending through them are distributed and are not bundled or overlapping about the periphery of the stator 102. Each set of coils 120, 124, 128 may have different characteristics such as a different number of wraps or "turns" through the slots 110, 114, 118 respectively and/or a different conductor size (e.g., wire gauge). These characteristics are also varied in order to produce an equivalent amount of magnetic flux among each set of slots 110, 114, 118 to insure desirable motor operation. Each set of coils 120, 124, 128 ends or terminates at an external connection of conductors or leads 129 that extend from the stator 102 and can be connected to a source of three-phase power such as a three-phase power system or supply.

Each circular path 111, 115, 119 of slots 110, 114, 118 and the respective coils 120, 124, 128 extending through them corresponds to one phase of a three-phase power source connection to the stator 102 via the leads 129 as part of an external rotor motor. For example, the outermost circular path 111 of slots 110 and respective coils 120 can correspond to a first phase (e.g., phase "1" or "A") of a three-phase power source connection. Similarly, the middle circular path 115 of slots 114 and respective coils 124 can correspond to a second phase (e.g., phase "2" or "B") of a three-phase power source connection. And finally, the innermost circular path 119 of slots 118 and respective coils 128 can correspond to a third phase (e.g., phase "3" or "C") of a three-phase power source connection. The corresponding phases may be different depending on the connection of the leads 129 to a three-phase power source.

The rotor 104 includes slots 130 positioned along a circular path (e.g., its periphery) and extending longitudinally along the rotor 104. Rotor bars 131, typically metallic conductors such as die-cast aluminum bars, extend through the slots 130. These rotor bars 131 are typically connected together at the ends (i.e., short-circuited) by one or more "end-rings" (not shown), which are also typically metallic conductors such as die-cast aluminum bars.

In operation, an external rotor motor including the above described stator 102 and rotor 104 typically operates on the principles of a three-phase alternating current ("AC") induction motor. That is, three-phase power is supplied to the coils 120, 124, 128 of the stator 102 via the leads 129. The flow of current through the coils 120, 124, 128 induces magnetic flux in the stator 102. The magnetic flux crosses the air gap 103 and interacts with the shorted rotor bars 131 to create a force that moves the rotor 104 about its rotational axis for example as indicated by the rotation mark 140. The rotation 140 of the rotor 104 can be reversed by altering the polarity of the three-phase power supplied to the coils 120, 124, 128, for example by switching two of the three connections at the leads 129.

In contrast to an internal rotor motor that includes a traditional "peripheral coil" stator, a motor that includes the distributed coil stator 102 offers various benefits such as the following. Less coil wire (which is typically copper) is needed since there is no bundling or cross-over of the coils at the periphery of the stator (for example, where a traditional stator might include 150-turns of coil wire through the slots for each phase, a distributed coil stator with comparable operating capabilities might include 120-turns of coil wire through the outermost circular path of slots, 100-turns of coil wire through the middle circular path of slots, and 80-turns of coil wire though the innermost circular path of slots). Less copper and steel are needed in components of the motor to dissipate heat produced during operation of the motor since the coils are distributed over a larger surface area of the stator and do not bundle or cross-over. Higher electro-mechanical operation efficiency is obtained since the distributed coil stator design decreases magnetic flux losses by avoiding coil cross-over. More speed options can be designed into the same diameter stator since characteristics of the slots (such as the size and/or shape) can be varied (e.g., for each phase) to vary the number of slots that are disposed in the stator and thereby the number of magnetic poles induced in the stator.

Because of the different flux paths, each coil will offer different reactance and hence the current flow will vary in each of these coils. This situation not desirable, such imbalance will produce flux that is not equal in strength as produced in convention motor where the slots are of similar shape and size. This flux imbalance can cause noise and vibration in the motor. However this issue can be resolved easily by designing each coil such that they produce equal flux by selecting correct number of turns in each coil and proper gauge of wire. Therefore winding of each coil, unlike conventional motor will have different number of turns in order to create flux that is similar in strength in each of the phase coils when passing through the air gap.

For typical conventional motor we may have 150 turns in each of the coils 120, 124, and 128. While in case of three layer slots winding of the my proposed design we may have 120 turns in coil 120, 100 turns in coil 124 and 80 turns in coil 128. Coils 124 and 128 will have less resistance and will allow more current to produce more flux to overcome the losses caused by in the longer iron path.

It is thus seen that a distributed coil stator for external rotor electric motors is now provided to reduce coil wire usage by avoiding bundling and overlap, lower heat generation to decrease copper and metal materials needed for dissipation, decrease magnetic losses resulting in higher electro-mechanical efficiency, and offer more motor speed options using the same stator diameter. It should be understood that the foregoing descriptions merely relate to exemplary, illustrative embodiments of the invention. Furthermore, various elements of the described exemplary embodiments may be known in the art or recognized by one of ordinary skill in the art based on the disclosure herein. Therefore, it should also be understood that various modifications may be made to exemplary embodiments described herein that are within the spirit and scope of the invention as set forth in the following claims.

The invention claimed is:

1. A distributed coil stator for three phase external rotor electric motors, comprising a core having a cylindrical surface bounded by a first end surface and a second end surface, a first set of openings aligned in a first circular path extends along said core between said first end surface and said second end surface, a second set of openings aligned in a second circular path positioned concentrically within said first circular path extends along said core between said first end surface and said second end surface, a third set of openings aligned in a third circular path positioned concentrically within said second circular path extends along said core between said first end surface and said second end surface, and a first plurality of conductors extending through said first set of openings and wrapping around in at least one loop between adjacent pairs of said first set of openings to form a first set of stator coils, a second plurality of conductors extending through said second set of openings and wrapping around in at least one loop between adjacent pairs of said second set of openings to form a second set of stator coils, and a third plurality of conductors extending through said third set of openings and wrapping around in at least one loop between adjacent pairs of said third set of openings to form a third set of stator coils.

2. The distributed coil stator of claim 1, wherein said first set of stator coils corresponds to a first phase of a three-phase power system, said second set of stator coils corresponds to a second phase of said three-phase power system, and said third set of stator coils corresponds to a third phase of said three-phase power system.

3. The distributed coil stator of claim 1, wherein at least one of said first, second, and third plurality of conductors extends through and wraps around between said adjacent pairs of said first, second, or third set of openings respectively in a different number of loops than said other pluralities.

4. The distributed coil stator of claim 1, wherein said first plurality of conductors extends through and wraps around between said adjacent pairs of said first set of openings in a first number of loops, said second plurality of conductors extends through and wraps around between said adjacent pairs of said second set of openings in a second number of loops, and said third plurality of conductors extends through and wraps around between said adjacent pairs of said third set of openings in a third number of loops, said first number of loops being greater than said second number of loops being greater than said third number of loops.

5. The distributed coil stator of claim 1, wherein said core is disposed concentrically within a rotor comprising an annular mass having a plurality of openings extending longitudinally therethrough and positioned in a fourth circular path, wherein a fourth plurality of conductors extend through said plurality of openings and are electrically connected.

6. A method for providing a distributed coil stator for external rotor electric motors, comprising:
providing a core having a cylindrical surface bounded by a first end surface and a second end surface;
forming a first set of openings that extend within said core from said first end surface to said second end surface along a first circular path;
forming a second set of openings that extend within said core from said first end surface to said second end surface along a second circular path concentrically disposed within said first circular path;
forming a third set of openings that extend within said core from said first end surface to said second end surface along a third circular path concentrically disposed within said second circular path
extending a first plurality of conductors through said first set of openings and wrapping said first plurality of conductors around in at least one loop between adjacent pairs of said first set of openings to form a first set of stator coils;
extending a second plurality of conductors through said second set of openings and wrapping said second plurality of conductors around in at least one loop between adjacent pairs of said second set of openings to form a second set of stator coils; and
extending a third plurality of conductors through said third set of openings and wrapping said third plurality of conductors around in at least one loop between adjacent pairs of said third set of openings to form a third set of stator coils.

7. The method of claim 6, further comprising configuring the number of loops of at least one of said first, second, and third plurality of conductors extended through and wrapped around between said adjacent pairs of said first, second, or third set of openings respectively dependent on the desired amount of operational magnetic flux to be produced by said first, second, or third stator coils respectively.

8. The method of claim 6, further comprising:
extending through and wrapping around said first plurality of conductors between said adjacent pairs of said first set of openings in a first number of loops;
extending through and wrapping around said second plurality of conductors between said adjacent pairs of said second set of openings in a second number of loops; and
extending through and wrapping around said third plurality of conductors between said adjacent pairs of said third set of openings in a third number of loops,
wherein said first number of loops is greater than said second number of loops which is greater than said third number of loops.

9. The method of claim 6, further comprising:
providing a rotor comprising an annular mass having a plurality of openings extending longitudinally therethrough positioned in a fourth circular path and a fourth plurality of conductors extending through said plurality of openings and electrically connected; and
disposing said core concentrically within said rotor.

10. A coil stator comprising:
a core;
a first annular array of openings;
a second annular array of openings positioned concentrically within said first annular array of openings;
a third annular array of openings positioned concentrically within said second annular array of openings,
a first plurality of conductors extending through said first array of openings and wrapping around in at least one loop between adjacent pairs of said first array of openings to form a first set of stator coils, a second plurality of conductors extending through said second array of openings and wrapping around in at least one loop between adjacent pairs of said second array of openings to form a second set of stator coils, and a third plurality of conductors extending through said third array of openings and wrapping around in at least one loop between adjacent pairs of said third array of openings to form a third set of stator coils.

11. The distributed coil stator of claim 10, wherein said first set of stator coils corresponds to a first phase of a three-phase power system, said second set of stator coils corresponds to a second phase of said three-phase power system, and said third set of stator coils corresponds to a third phase of said three-phase power system.

* * * * *